United States Patent Office 3,275,607
Patented Sept. 27, 1966

3,275,607
CURING THIOCARBONYL FLUORIDE/ALLYL
CHLOROFORMATE COPOLYMERS WITH
POLYVALENT METAL OXIDES
James N. Coker, Wilmington, Del., assignor to E. I. du Pont de Nemours and Company, Wilmington, Del., a corporation of Delaware
No Drawing. Filed Oct. 31, 1962, Ser. No. 234,547
12 Claims. (Cl. 260—77.5)

This invention relates to, and has as its principal objects provision of, certain novel and useful curable elastomer compositions, the conversion of such compositions to cured products and the cured products themselves.

Polymers of thiocarbonyl fluoride have recently become available (Middleton U.S. Patent 3,240,765; see also Middleton U.S. Patent 2,980,695), and they possess a number of outstanding properties. Among such polymers the copolymers of thiocarbonyl fluoride with allyl chloroformate having a high molecular weight, e.g., a molecular weight of more than 75,000, have been found to be tough and elastic. However, certain properties of these copolymers, e.g., resilience and solubility characteristics, are not entirely satisfactory for some uses.

It has now been found that the properties of thiocarbonyl fluoride/allyl fluoroformate copolymers can be greatly improved by curing by the process of the present invention. This process comprises incorporating in a copolymer of thiocarbonyl fluoride with allyl chloroformate containing 0.1 to 10.0 mole percent of allyl chloroformate, 1–40%, by weight of the copolymer, of an oxide of an element from Groups I–B, II–A, II–B of the Periodic Table, tin or lead, and heating the resulting mixture at 50°–150° C. under superatmospheric pressure until a cured elastomer is obtained. It will be understood that more than one metal oxide can be incorporated in and reacted with the same copolymer.

The resulting cured elastomers possess an unusually good combination of properties, e.g., high tensile strength and elongation, high resilience, ability to withstand severe deformation in compression without permanent change of shape, and insolubility.

The curable elastomer compositions comprising a copolymer of thiocarbonyl fluoride and allyl chloroformate containing 0.1–10.0 mole percent of allyl chloroformate and 1–40% by weight of the copolymer of an oxide of an element from Groups I–B, II–A, II–B of the Periodic Table, tin or lead are also a part of this invention. Especially preferred compositions are those of the 1–5 mole percent allyl chloroformate copolymer containing 15–30%, by weight of the copolymer, of metal oxide.

The thiocarbonyl fluoride/allyl chloroformate copolymers used in the process and compositions of this invention can be prepared by polymerizing thiocarbonyl fluoride and allyl chloroformate in the desired proportions in the presence of free-radical liberating initiators. Initiators that are especially useful in this process are the trialkylboron/oxidant type, e.g., tributylboron in combination with oxygen, in proportions ranging from 0.1 to 10% of the weight of the polymerizable monomers. The polymerization can be carried out in the presence or absence of an inert solvent, e.g., dichlorodifluoromethane. More particularly, a glass reaction vessel equipped with inlet tubes for introducing reactants is purged with nitrogen and cooled to −80° C. Into the reaction vessel there are introduced in turn the allyl chloroformate, then the tributylboron initiator, then the thiocarbonyl fluoride in the desired proportions, and finally oxygen, which may be added as air. The reaction mixture is then maintained at −80° C. for several hours, e.g., 16–20 hrs. This process is described in greater detail in U.S. Patent 3,240,765 mentioned above.

In preparing the copolymers of thiocarbonyl fluoride and allyl chloroformate that produce cured elastomers having the best properties, it is necessary to carry out the polymerization under conditions that yield high molecular weight products, e.g., polymers having molecular weights over 75,000 (as determined from the osmotic pressure exhibited by dilute chloroform solutions). Copolymers of thiocarbonyl fluoride and allyl chloroformate containing 1–10% allyl chloroformate and having molecular weights of 300,000 to 500,000 can be prepared by the above described general procedure with the rigorous exclusion of moisture from the polymerization system. Details of the preparation of a copolymer of these preferred properties are as follows:

A glass reaction vessel fitted with a stirrer and two inlet tubes is employed. One of the inlet tubes is connected through a two-way stopcock to a small flask containing anhydrous allyl chloroformate. The other inlet tube is connected with sources of thiocarbonyl fluoride, dichlorodifluoromethane (used as reaction diluent) and helium (used as a reaction system purge) by way of a glass tube containing phosphorus pentoxide coated on glass helices. After the polymerization vessel has been carefully flamed out in vacuo, it is filled with helium and cooled to −78° C. About 40% of the triethylboron catalyst to be used is then injected. The flask is next evacuated, filled with oxygen, and allowed to stand in this condition for ½ hour. After the unreacted oxygen has been purged completely from the system, the reaction flask is cooled to liquid nitrogen temperature and dichlorodifluoromethane and thiocarbonyl fluoride are charged through the phosphorus pentoxide-filled drying tube. The allyl chloroformate is next flashed in and the resulting mixture is blanketed with helium and allowed to warm to −78° C. The remainder of the triethylboron catalyst is then injected and stirring is continued until the charge has formed a gelatinous, almost rigid, mass, about 1 to 2 hours usually being required for this to take place. The mixture is finally allowed to stand for an additional 16 hours at −78° C. The resulting cold, white mass of copolymer is washed extensively with petroleum ether under a blanket of nitrogen. This washing is continued until the polymer reaches room temperature and no longer contains appreciable amounts of gaseous materials. The product is isolated in the form of a petroleum ether slurry which can be stored for several weeks in this form without any appreciable deterioration.

The thiocarbonyl fluoride/allyl chloroformate copolymer-metal oxide compositions of this invention are prepared simply by uniformly mixing the metal oxide with the copolymer in the desired proportions. As indicated previously the amount of metal oxide curing agent can range from 1% to 40% by weight of the copolymer employed. This mixing can be accomplished by conventional means, e.g., by blending the metal oxide with a slurry of flocculent copolymer in petroleum ether or by milling the copolymer with the metal oxide in the presence of a swelling, nonsolvent, e.g., petroleum ether, in a conventional rubber mill. The resulting mixture of copolymer and metal oxide is then simply heated under pressure, e.g., in the form of a film or any other desired shape, at a temperature of 50°–150° C., and preferably at 100°–135° C., until the composition is cured. Curing times of 1–2 hours are generally sufficient; however, longer or shorter times can be used in some cases. The pressure used is not critical as pressures ranging from a few pounds per square inch, e.g., 100 p.s.i., ranging up to 14,000 p.s.i. or more can be used.

The physical properties of the cured copolymer of thiocarbonyl fluoride and allyl chloromormate are dependent on several factors, e.g., the molecular weight of the copolymer employed as starting material, the proportions of allyl chloroformate and thiocarbonyl fluoride in the copolymer, the particular metal oxide employed and its proportions, and the particular curing cycle employed.

In general, best results are obtained in the process of this invention with zinc oxide, cuprous oxide, cadmium oxide and mercuric oxide. Of all the metal oxide curing agents, zinc oxide is most preferred. The superior performance of this oxide appears to be due, at least in part, to its compatibility over a wide composition range with thiocarbonyl fluoride-rich copolymers and its apparent ability to behave as a filling and reinforcing agent in the compositions.

The general effect of the various factors mentioned above on the properties of thiocarbonyl fluoride/allyl-chloroformate copolymers cured by means of zinc oxide can be summarized as follows.

The elasticity of the cured copolymer is increased by factors which tend to reduce the crosslink density, e.g., lower allyl chloroformate content in the copolymer, lower zinc oxide loading, and the shorter curing cycles.

The maximum tensile strengths of the cured compositions are generally obtained at lower chloroformate concentrations in the copolymers. Up to a point, tensile properties are enhanced at any allyl chloroformate level in the copolymer by the factors which increase the crosslink density of the product. However, higher maximum values are observed as the chloroformate content is reduced. Since the molecular weight of the copolymer is likely increasing in the same direction, a relationship between observed tensile strength and molecular weight is indicated.

Due to the filling and reinforcing action of zinc oxide in the compositions, maximum tensile strength values and high elongation values are observed at the higher, e.g., 15–30 weight percent, zinc oxide loadings.

The process and compositions of this invention are illustrated further by the following examples in which the proportions of ingredients are expressed in parts by weight unless otherwise noted.

*Example 1*

A sample (20 parts) of a copolymer of thiocarbonyl fluoride and allyl chloroformate containing approximately 2 mole percent of allyl chloroformate and having a molecular weight of about 400,000 is ground under petroleum ether in a mortar with 4 parts of barium oxide (20% by weight of the copolymer). The barium oxide-containing copolymer is removed from the petroleum ether and is coalesced by pressing at room temperature. The resulting film, still moist with petroleum ether, is heated at 100° C. for 1.5 hours under a slight pressure (ca. 100 p.s.i.) in a hydraulic press. There is obtained a highly elastic, moderately tough film of cured copolymer. In contrast to the original polymer, this product is insoluble in chloroform.

*Example 2*

The procedure of Example 1 is repeated with the single exception that 1 part of magnesium oxide (5% by weight of the copolymer) is substituted for the barium oxide. There is obtained a highly elastic, moderately tough, chloroform-insoluble film of cured copolymer of thiocarbonyl fluoride and allyl chloroformate.

*Examples 3–14*

In these examples, which are summarized in the following Table, a slurry of a high molecular weight copolymer of thiocarbonylfluoride and allyl chloroformate containing approximately 2 mole percent allyl chloroformate is mixed with the indicated proportions of metal oxide curing agent in a mortar under petroleum ether as described in Example 1. After removing the polymer mixture from the petroleum ether, it is pressed to a film three times at room temperature to remove most of the petroleum ether. The copolymer is then heated in a 3 in. by 3 in. mold at the temperature and pressure indicated in the table for the indicated time. The films obtained are tough and elastic and are insoluble in chloroform. The physical properties of the resulting cured films are summarized in the table.

TABLE.—CURING OF THIOCARBONYL FLUORIDE/ALLYL CHLOROFORMATE COPOLYMERS WITH METAL OXIDES

| Example No. | Mol percent Allyl chloroformate in Copolymer | Metal Oxide | Wt. percent (based on copolymer) | Curing Conditions | | | Properties of Product | |
|---|---|---|---|---|---|---|---|---|
| | | | | Temp., °C. | Pres., p.s.i. | Time, hrs. | Tensile Strength, p.s.i. | Elongation (at break), percent |
| 3 | 2 | ZnO | 5.0 | 125 | 6,000 | 1 | 1,426 | 1,223 |
| 4 | 2 | ZnO | 15.0 | 125 | 6,000 | 1 | 1,299 | 1,505 |
| 5 | 2 | ZnO | 40.0 | 125 | 6,000 | 1 | 1,320 | 1,437 |
| 6 | 2 | CaO | 7.0 | 125 | 6,000 | 1 | 1,186 | 737 |
| 7 | 2 | Cu₂O | 25.0 | 125 | 6,000 | 1 | Dark brown, 1131 | 530 |
| 8 | 2 | CuO | 25.0 | 125 | 6,000 | 1 | Dark brown, 705 | 642 |
| 9 | 2 | HgO | 25.0 | 125 | 6,000 | 1 | Reddish, 1,132 | 302 |
| 10 | 2 | CdO | 25.0 | 125 | 6,000 | 1 | 1,393 | 770 |
| 11 | 2 | SrO | 25.0 | 125 | 6,000 | 1 | Grey, elastic film. | |
| 12 | 2 | PbO | 5.3 | 125 | 14,000 | 0.83 | Orange color, 812 | 763 |
| 13 | 2 | PbO₂ | 20.0 | 125 | 10,000 | 1 | Tough, elastic film. | |
| 14 | 2 | SnO | 20.0 | 125 | 10,000 | 1 | Dark grey, tough elastic film. | |

An important property of the cured thiocarbonyl fluoride/allyl chloroformate copolymers is the high resilience possessed by these products. For example, the Yerzley resilience values (ASTM method B–945) observed with thiocarbonyl fluoride/allyl chloroformate copolymers cured with zinc oxide range from 78 to 88%. A Yerzley resilience of 91% is obtained with a copolymer containing approximately 2 mole percent allyl chloroformate and cured with a mixture of zinc oxide and an epoxy resin (the resin known commercially as "Epon–812"), the zinc oxide and epoxy resin each being present in the amount of 4% by weight of the copolymer.

In addition to their high tensile strength, elongation, and resilience, the cured thiocarbonyl fluoride/allyl chloroformate copolymers are also able to withstand severe deformation in compression without permanent change of shape. For example a pellet of a copolymer cured with zinc oxide 0.982 in. high and 0.722 in. in diameter is flexed in a Goodrich Flexometer (ASTM test No. D623–58) as follows. The specimen is compressed to a height of 0.369 in. and then flexed between the limits of 0.244 in. and 0.494 in. at 1800 cycles/min. for 260 min. The final height of the pellet is 0.983 in. or the same as the original height within experimental error. In the same test a cured natural rubber pellet 0.987 in. high and 0.750 in. in diameter is compressed to a height of 0.344 in. It is then flexed also with 0.25 in. displacement between the limits of 0.219 in. and 0.469 in. After 260 min. at 1800 cycles/min. the height is 0.950 in. or a loss of 0.037 in.

The cured thiocarbonyl fluoride/allyl chloroformate metal oxide compositions of this invention possess better physical properties, i.e., tensile strength and elongation, than similar copolymers cured by other curing agents. For example, a copolymer containing approximately 2 mole percent allyl chloroformate cured with 3–6% of the diepoxide derived from glycerol and epichlorhydrin exhibits tensile strengths of 288–424 p.s.i., and elongation (at break) of 240–609%. In contrast, similar copolymers cured with 5% zinc oxide exhibit a tensile strength of 1426 p.s.i., and an elongation (at break) of 1223% (see Example 3).

The curable compositions of this invention can also include other additives. For example, they can be modified with other elastomers, e.g., natural rubber, styrene-butadiene copolymers, chloroprene polymers, butadiene-acrylonitrile copolymers, and other synthetic rubbers. They can also contain conventional fillers such as carbon black or silica in the proportions commonly employed in elastomer applications.

The cured thiocarbonyl fluoride/allyl chloroformate copolymers are useful in various applications in view of the particular combinations of properties they possess. They are especially useful in those applications for elastomers which require high resilience. The cured thiocarbonyl fluoride/allyl chloroformate copolymers are also useful as elastic fibers, elastic films, elastic coatings for other films and for fabrics, flexible sheeting and tubing, motor mounts, tire treads, and the like. In their application as coatings the curable compositions of this invention can be applied to a substrate and then cured to form the insoluble elastomeric coating.

Since obvious modifications and equivalents in the invention will be evident to those skilled in the chemical arts, I propose to be bound solely by the appended claims.

The embodiments of the invention in which an exclusive property or privilege is claimed are defined as follows:

1. A composition of matter comprising an intimate mixture of (1) a thiocarbonyl fluoride/allyl chloroformate copolymer containing 0.1–10 mole percent of allyl chloroformate and (2) 1–40% by weight based on the weight of the copolymer of at least one member of the group consisting of the oxides of metals selected from Groups I–B, II–A, and II–B of the Periodic Table, tin and lead.

2. A composition of matter of claim 1 wherein the copolymer has a molecular weight of at least 75,000.

3. A composition of matter comprising an intimate mixture of (1) a thiocarbonyl fluoride/allyl chloroformate copolymer containing about 1–5 mole percent of allyl chloroformate and having a molecular weight of at least 75,000 and (2) 15–30% by weight based on the weight of the copolymer of zinc oxide.

4. An elastomer comprising a thiocarbonyl fluoride/allyl chloroformate copolymer containing 0.1–10 mole percent of allyl chloroformate cured by reaction with 1–40% by weight based on the weight of the copolymer of at least one member of the group consisting of the oxides of metals selected from Groups I–B, II–A and II–B of the Periodic Table, tin and lead.

5. An elastomer of claim 4 wherein the copolymer has a molecular weight of at least 75,000.

6. An elastomer comprising a thiocarbonyl fluoride/allyl chloroformate copolymer containing about 1–5 mole percent of allyl chloroformate and having a molecular weight of at least 75,000 cured by reaction with 15–30% by weight based on the weight of the copolymer of zinc oxide.

7. An elastomer of claim 4 in the form of a manufacture.

8. An elastomer of claim 4 in the form of a film.

9. An elastomer of claim 6 in the form of a manufacture.

10. The process of curing a thiocarbonyl fluoride/allyl chloroformate copolymer containing 0.1–10 mole percent of allyl chloroformate which comprises reacting the same, at a temperature of 50–150° C., with 1–40% by weight based on the weight of the copolymer of at least one member of the group consisting of the oxides of metals selected from Groups I–B, II–A and II–B of the Periodic Table, tin and lead.

11. The process of claim 10 wherein the copolymer has a molecular weight of at least 75,000.

12. The process of curing a thiocarbonyl fluoride/allyl chloroformate copolymer containing 0.1–10 mole percent of allyl chloroformate and having a molecular weight of at least 75,000 which comprises reacting the same, at a temperature of 50–150° C., with 15–30% by weight based on the weight of the copolymer of zinc oxide.

References Cited by the Examiner

UNITED STATES PATENTS

| | | | |
|---|---|---|---|
| 3,001,995 | 12/1961 | Smith | 260—41 |
| 3,113,936 | 12/1963 | Middleton | 260—79 |

MORRIS LIEBMAN, *Primary Examiner.*

K. B. CLARK, L. T. JACOBS, *Assistant Examiners.*